US010497927B2

(12) United States Patent
Xiao (10) Patent No.: US 10,497,927 B2
(45) Date of Patent: Dec. 3, 2019

(54) METHODS OF APPLYING SELF-FORMING ARTIFICIAL SOLID ELECTROLYTE INTERFACE (SEI) LAYER TO STABILIZE CYCLE STABILITY OF ELECTRODES IN LITHIUM BATTERIES (71) Applicant: GM Global Technology Operations LLC, Detroit, MI (US)

(72) Inventor: Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 15/692,107

(22) Filed: Aug. 31, 2017

(65) Prior Publication Data

US 2019/0067675 A1 Feb. 28, 2019

(51) Int. Cl.
| H01M 4/02 | (2006.01) |
| H01M 4/04 | (2006.01) |
| H01M 4/38 | (2006.01) |
| H01M 4/60 | (2006.01) |
| H01M 10/0525 | (2010.01) |

(52) U.S. Cl.
CPC ......... *H01M 4/0421* (2013.01); *H01M 4/382* (2013.01); *H01M 4/386* (2013.01); *H01M 4/602* (2013.01); *H01M 10/0525* (2013.01); *H01M 2004/027* (2013.01)

(58) Field of Classification Search
CPC ............. H01M 4/0421; H01M 4/0423; H01M 4/0428; H01M 4/382; H01M 4/386; H01M 4/602; H01M 10/0525; H01M 2004/027
See application file for complete search history.

(56) References Cited

U.S. PATENT DOCUMENTS

| 5,871,720 | A | 2/1999 | Gutierrez et al. |
| 6,060,184 | A | 5/2000 | Gan et al. |
| 7,722,994 | B2 | 5/2010 | Halalay |
| 8,394,539 | B2 | 3/2013 | Geiculescu et al. |
| 8,586,222 | B2 | 11/2013 | Timmons et al. |
| 8,802,301 | B2 | 8/2014 | Halalay et al. |
| 9,034,519 | B2 | 5/2015 | Xiao et al. |
| 9,059,451 | B2 | 6/2015 | Xiao et al. |
| 9,123,939 | B2 | 9/2015 | Xiao et al. |
| 9,160,036 | B2 | 10/2015 | Yang et al. |
| 9,252,411 | B2 | 2/2016 | Abd Elhamid et al. |
| 9,302,914 | B2 | 4/2016 | Liu et al. |
| 9,350,046 | B2 | 5/2016 | Huang |
| 9,362,552 | B2 | 6/2016 | Sohn et al. |
| 9,373,829 | B2 | 6/2016 | Xiao et al. |
| 9,437,871 | B2 | 9/2016 | Zhou et al. |
| 9,531,004 | B2 | 12/2016 | Xiao et al. |
| 9,627,716 | B2 | 4/2017 | Yang et al. |
| 9,647,254 | B2 | 5/2017 | Dadheech et al. |
| 9,742,028 | B2 | 8/2017 | Zhou et al. |
| 9,896,763 | B2 | 2/2018 | Dadheech et al. |
| 2004/0018430 | A1* | 1/2004 | Holman ................. H01M 4/13 429/233 |
| 2008/0131783 | A1 | 6/2008 | Choi et al. |
| 2011/0091768 | A1 | 4/2011 | Ohashi et al. |
| 2011/0155962 | A1* | 6/2011 | Choi ..................... C08F 234/04 252/500 |
| 2011/0223490 | A1 | 9/2011 | Andou et al. |
| 2012/0109503 | A1 | 5/2012 | Yang et al. |
| 2012/0121989 | A1 | 5/2012 | Roberts et al. |
| 2012/0231325 | A1 | 9/2012 | Yoon et al. |
| 2012/0295155 | A1 | 11/2012 | Deng et al. |
| 2014/0265557 | A1 | 9/2014 | Huang et al. |
| 2015/0056387 | A1 | 2/2015 | Dadheech et al. |
| 2015/0056493 | A1 | 2/2015 | Dadheech et al. |
| 2015/0056507 | A1 | 2/2015 | Dadheech et al. |
| 2015/0236324 | A1 | 8/2015 | Xiao et al. |
| 2015/0349307 | A1 | 12/2015 | Dadheech et al. |
| 2016/0020491 | A1 | 1/2016 | Dai et al. |
| 2016/0141598 | A1 | 5/2016 | Dai et al. |
| 2016/0172665 | A1 | 6/2016 | Zhou et al. |
| 2016/0172681 | A1 | 6/2016 | Yang et al. |

(Continued)

FOREIGN PATENT DOCUMENTS

| CN | 109428057 A | 3/2019 |
| DE | 102018121026 A1 | 2/2019 |

(Continued)

OTHER PUBLICATIONS

Lee, D.J., Lee, H., Song, J., Ryou, M.-H., Lee, Y.M., Kim, H.-T., Park, J.-K.-Composite protective layer for Li metal anode in high-performance lithium-oxygen batteries, Electrochemistry Communications 40 (2014), pp. 45-48 (Year: 2014).*

Yasuoka, H., Yoshida, M., Sugita, K., Ohdaira, K., Murata, H., Matsumura, H.-Fabrication of PTFE thin films by dual catalytic chemical vapor deposition method, Thin Solid Films 516 (2008), pp. 687-690 (Year: 2008).*

Xue-Qiang Zhang et al.; "Fluoroethylene Carbonate Additives to Render uniform Li Deposits in Lithium Metal Batteries"; Advanced Functional Materials 2017, 27, 1605989; 8 pages.

Elena Markevich et al.; "Fluoroethylene Carbonate as an Important Component for the Formation of an Effective Solid Electrolyte Interphase on Anodes and Cathode for Advanced Li-Ion Batteries"; American Chemical Society Energy Letters 2017, 2; May 5, 2017; pp. 1337-1345.

(Continued)

*Primary Examiner* — Anca Eoff
(74) *Attorney, Agent, or Firm* — Harness, Dickey & Pierce, P.L.C.

(57) ABSTRACT

A method of making a negative electrode for an electrochemical cell includes applying a fluoropolymer via a deposition process to one or more surface regions of an electroactive material. The electroactive material may be selected from the group consisting of: lithium metal, silicon metal, silicon-containing alloys, and combinations thereof. The fluoropolymer reacts with lithium to form a composite surface layer on the one or more surface regions that comprises an organic matrix material having lithium fluoride particles distributed therein. Electrochemical cells including such negative electrode are also provided.

18 Claims, 5 Drawing Sheets

(56) References Cited

U.S. PATENT DOCUMENTS

| | | |
|---|---|---|
| 2016/0172706 A1 | 6/2016 | Xiao et al. |
| 2016/0172710 A1 | 6/2016 | Liu et al. |
| 2016/0211498 A1 | 7/2016 | Kim et al. |
| 2016/0218342 A1 | 7/2016 | Xiao et al. |
| 2016/0254567 A1 | 9/2016 | Cai et al. |
| 2016/0372743 A1* | 12/2016 | Cho .................. H01M 4/382 |
| 2017/0141382 A1 | 5/2017 | Dadheech et al. |
| 2017/0141383 A1 | 5/2017 | Dadheech et al. |
| 2017/0162859 A1 | 6/2017 | Yang et al. |
| 2017/0214079 A1 | 7/2017 | Dai et al. |
| 2017/0222210 A1 | 8/2017 | Xiao |
| 2017/0271678 A1 | 9/2017 | Yang et al. |
| 2017/0288230 A1 | 10/2017 | Yang et al. |
| 2017/0338490 A1 | 11/2017 | Xiao et al. |
| 2018/0048022 A1 | 2/2018 | Yang et al. |
| 2018/0287207 A1 | 10/2018 | Dai et al. |
| 2018/0309165 A1 | 10/2018 | Yersak et al. |
| 2018/0309166 A1 | 10/2018 | Yersak et al. |
| 2018/0309169 A1 | 10/2018 | Yang et al. |
| 2018/0375148 A1 | 12/2018 | Yersak et al. |
| 2019/0051926 A1* | 2/2019 | Chao ............... H01M 10/0525 |

FOREIGN PATENT DOCUMENTS

| | | |
|---|---|---|
| WO | WO-2014182281 A1 | 11/2014 |
| WO | WO-2015126649 A1 | 8/2015 |
| WO | 2017045573 A1 | 3/2017 |

OTHER PUBLICATIONS

Soshi Shiraishi et al.; "Electric Double Layer Capacitance of Highly Porous Carbon Derived from Lithium Metal and Polytetrafluoroethylene"; Electrochemical and Solid-State Letters, 4 (1); 2001; pp. A5-A8.

Li Yang et al.; U.S. Appl. No. 15/070,677, filed Mar. 15, 2016, entitled "Primer Surface Coating for High-Performance Silicon-Based Electrodes"; 50 pages.

Li Yang et al.; U.S. Appl. No. 15/085,510, filed Mar. 30, 2016, entitled "Negative Electrode Including a Polymeric Single-Ion Conductor Coating" 25 pages.

Li Yang et al.; U.S. Appl. No. 15/237,378, filed Aug. 15, 2016, entitled "Gel Electrolytes and Precursors Thereof"; 23 pages.

Xingcheng Xiao et al.; U.S. Appl. No. 15/160,377, filed May 20, 2016, entititled "Polymerization Process for Forming Polymeric Ultrathin Conformal Coatings on Electrode Materials"; 45 pages.

Li Yang et al.; U.S. Appl. No. 15/491,089, filed Apr. 19, 2017, entitled "Electrolyte System for Silicon-Containing Electrodes"; 39 pages.

* cited by examiner

METHODS OF APPLYING SELF-FORMING ARTIFICIAL SOLID ELECTROLYTE INTERFACE (SEI) LAYER TO STABILIZE CYCLE STABILITY OF ELECTRODES IN LITHIUM BATTERIES

GOVERNMENT SUPPORT

This invention was made with government support under DE-EE0007787 awarded by the U.S. Department of Energy. The Government has certain rights in the invention.

INTRODUCTION

This section provides background information related to the present disclosure which is not necessarily prior art.

The present disclosure relates to methods of making a negative electrode for an electrochemical cell including applying a fluoropolymer to an electroactive material comprising lithium or silicon that self-forms a composite layer serving as an artificial solid electrolyte interface (SEI) layer to enhance cycle stability of electrodes and maintain charge capacity of the electrochemical cell. The present disclosure also relates to negative electrodes made from such processes.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion, lithium sulfur, and lithium-lithium symmetrical batteries include a first electrode, a second electrode, an electrolyte material, and a separator. One electrode serves as a positive electrode or cathode and another serves as a negative electrode or anode. A stack of battery cells may be electrically connected to increase overall output. Conventional rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium ion battery. The negative electrode typically includes a lithium insertion material or an alloy host material. Typical electroactive materials for forming an anode include lithium-graphite intercalation compounds, lithium-silicon intercalation compounds, lithium-tin intercalation compounds, lithium alloys. While graphite compounds are most common, recently, anode materials with high specific capacity (in comparison with graphite) are of growing interest. For example, aside from lithium itself, silicon has the highest known theoretical charge capacity for lithium, making it one of the most promising materials for rechargeable lithium ion batteries.

However, current anode materials comprising silicon (e.g., silicon metal or silicon alloys) can suffer from large volumetric expansion. Large volume changes (e.g., volume expansion/contraction of greater than 300%) of silicon-containing materials during lithium insertion/extraction (e.g., intercalation/alloy and deintercalation/dealloy-intercalation/alloy) can result in physical damage to the electrode, including wrinkling, fracture, or cracking. Such volumetric expansion thus can lead to loss of electrical contact and electrode activity. This is especially true at the loading density levels required for commercial viability of silicon-containing electrodes. The large volumetric expansion during intercalation/alloying of the anode comprising silicon, or other large volume expansion materials, can thus result in a decline of electrochemical cyclic performance, diminished Coulombic charge capacity (capacity fade), and extremely limited, poor cycle life.

The negative electrode may also be made of metallic lithium, so that the electrochemical cell is considered a lithium metal battery or cell. Metallic lithium for use in the negative electrode of a rechargeable battery has various potential advantages, including having the highest theoretical capacity and lowest electrochemical potential of various negative electrode materials. Thus, batteries incorporating lithium metal anodes can have a higher energy density that can potentially double storage capacity, so that the battery may be half the size, but still last the same amount of time as other lithium ion batteries. Thus, lithium metal batteries are one of the most promising candidates for high energy storage systems. However, lithium metal batteries also have potential downsides, including possibly exhibiting unreliable or diminished performance and potential premature electrochemical cell failure.

There are two primary causes for performance degradation with lithium negative electrodes. Side reactions can occur between the lithium metal and species in the adjacent electrolyte disposed between the positive and negative electrodes, which can compromise coulombic efficiency and cycling lifetime of rechargeable lithium batteries. Also, when the lithium metal is recharged, branchlike or fiber-like metal structures, called dendrites, can grow on the negative electrode. The metal dendrites may form sharp protrusions that potentially puncture the separator and cause an internal short circuit, which may cause cell self-discharge or cell failure through thermal runaway.

Accordingly, it would be desirable to develop reliable, high-performance negative electrode materials for use in high energy electrochemical cells, for example, those that are lithium-containing or silicon-containing that have high specific capacity for use in high energy electrochemical cells, which overcome the current shortcomings that prevent their widespread commercial use, for example, providing minimal capacity fade and maximal charge capacity for long-term use, especially in vehicle applications.

SUMMARY

This section provides a general summary of the disclosure, and is not a comprehensive disclosure of its full scope or all of its features.

The present disclosure provides in certain aspects, a method of making a negative electrode for an electrochemical cell. The method may include applying a fluoropolymer via a deposition process to one or more surface regions of an electroactive material. The electroactive material may be selected from the group consisting of: lithium metal, silicon metal, silicon-containing alloys, and combinations thereof. The fluoropolymer reacts with lithium to form a composite surface layer on the one or more surface regions. The composite surface layer includes an organic matrix material having lithium fluoride particles distributed therein.

In one aspect, the fluoropolymer is selected from the group consisting of: polyvinyl fluoride (PVF), polyvinylidene fluoride (PVDF), polytetrafluoroethylene (PTFE), polychlorotrifluoroethylene (PCTFE), perflouoralkoxy alkane (PFA), fluorinated ethylene propylene (FEP), ethylene tetrafluoroethylene (ETFE), ethylene chlorotrifluoroethylene (ECTFE), perfluoroelastomer (FFPM), and combinations thereof.

In one aspect, a temperature in a reaction chamber during the deposition process is less than or equal to about 180° C.

In one aspect, the composite surface layer has a thickness of greater than or equal to about 5 nm to less than or equal to about 50 μm.

In one aspect, the deposition process is selected from the group consisting of: physical vapor deposition (PVD), chemical vapor deposition (CVD), and wet chemistry polymerization.

In one aspect, the electroactive material is lithium metal.

In one aspect, the electroactive material is provided as a foil or a film of the electroactive material.

In one aspect, the electroactive material is silicon metal or a silicon-containing alloy and the method further includes pre-lithiating the electroactive material prior to the applying.

In one aspect, the electroactive material is contained in a pre-fabricated electrode layer and the composite surface layer is formed on at least one surface of the pre-fabricated electrode layer.

In one aspect, the electroactive material includes a plurality of particles, so that the composite surface layer is applied to the plurality of particles that subsequently form the negative electrode.

In one aspect, the method further includes forming an electrochemical cell that cycles lithium ions. The method may include assembling the negative electrode with a positive electrode, a separator, and an electrolyte to form the electrochemical cell. The electrochemical cell is capable of maintaining charge capacity within 25% of an initial charge capacity for greater than or equal to about 500 hours of operation.

The present disclosure provides in other aspects, a negative electrode for an electrochemical cell. Prior to incorporation into the electrochemical cell, the negative electrode has an electroactive material with a composite surface layer formed on greater than or equal to about 90% of an exposed surface area of the electroactive material. The electroactive material is selected from the group consisting of: lithium metal, silicon metal, silicon-containing alloys, and combinations thereof. The composite material includes an organic matrix material having lithium fluoride particles distributed therein.

In one aspect, the composite surface layer is formed on greater than or equal to about 98% of the exposed surface area of the electroactive material.

In one aspect, the composite surface layer has a thickness of greater than or equal to about 5 nm to less than or equal to about 50 μm.

In one aspect, the organic matrix material includes an alkyne group and the lithium fluoride particles are nanocrystals.

In one aspect, the electroactive material is lithium metal provided as a foil or a film.

In one aspect, the electroactive material is contained in a pre-fabricated electrode layer and the composite surface layer is formed on at least one surface of the pre-fabricated electrode layer.

In one aspect, the electroactive material includes a plurality of particles, so that the composite surface layer is applied to the plurality of particles that subsequently form the negative electrode.

In yet other aspects, the present disclosure provides an electrochemical cell that cycles lithium ions. The electrochemical cell includes a negative electrode including an electroactive material selected from the group consisting of: lithium metal, silicon metal, silicon-containing alloys, and combinations thereof. The negative electrode has a composite surface layer formed on greater than or equal to about 90% of an exposed surface area of the electroactive material. The composite material includes an organic matrix material having lithium fluoride particles distributed therein. The electrochemical cell also includes a positive electrode, a separator, and an electrolyte.

In one aspect, the electrochemical cell is capable of maintaining charge capacity within 25% of an initial charge capacity for greater than or equal to about 500 hours of operation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical compound, but which may also comprise additional substances or compounds, including impurities.

Example embodiments will now be described more fully with reference to the accompanying drawings.

The present technology pertains to improved electrochemical cells, especially lithium-ion or lithium-metal batteries, which may be used in vehicle applications. However, the present technology may also be used in other electrochemical devices; especially those that comprise lithium, such lithium sulfur batteries, so that any discussion of a lithium-ion battery is exemplary and non-limiting.

Figure 1:
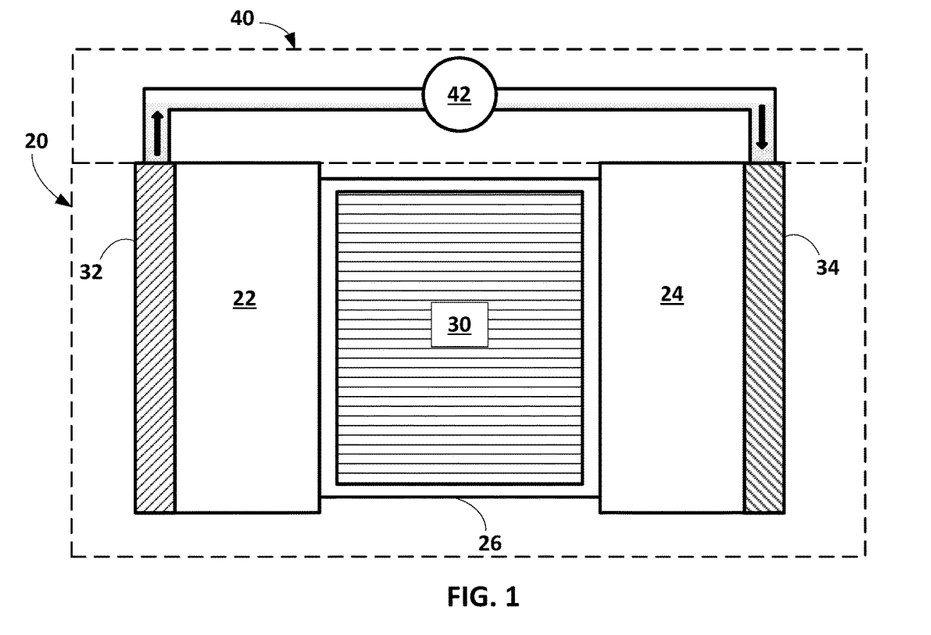
FIG. 1 is a schematic of an exemplary electrochemical battery for purposes of illustration.

An exemplary and schematic illustration of a battery 20 that cycles lithium ion is shown in FIG. 1. Battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20.

The battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of lithium. The chemical potential difference between the positive electrode 24 and the negative electrode 22 drives electrons produced at the negative electrode 22 through the external circuit 40 toward the positive electrode 24. Lithium ions, which are also produced at the negative electrode 22, are concurrently transferred through the electrolyte 30 and porous separator 26 towards the positive electrode 24. The electrons flow through the external circuit 40 and the lithium ions migrate across the porous separator 26 in the electrolyte 30 to the positive electrode 24, where they may be plated, reacted, or intercalated. The electric current passing through the external circuit 18 can be harnessed and directed through the load device 42 until the intercalated lithium in the negative electrode 22 is depleted and the capacity of the battery 20 is diminished. While in lithium-ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode 22.

The battery 20 can be charged or re-energized at any time by connecting an external power source to the battery 20 to reverse the electrochemical reactions that occur during battery discharge. The connection of an external power source to the battery 20 compels the production of electrons and release of lithium ions from the positive electrode 25. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and handheld consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, the porous separator 26 may include, in certain instances, a microporous polymeric separator including a polyolefin, by way of non-limiting example. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

The positive electrode 24 may be formed from a lithium-based active material that can sufficiently undergo lithium intercalation and deintercalation, alloying and dealloying, or plating and stripping, while functioning as the positive terminal of the battery 20. The positive electrode 24 electroactive materials may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structure and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$ (LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \le x \le 1$, $0 \le y \le 1$, $0 \le z \le 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0 \le x \le 1$, and/or a lithium manganese nickel cobalt oxide (e.g., $LiMn_{1/3}Ni_{1/3}Co_{1/3}O_2$). In a lithium-sulfur battery, positive electrodes may have elemental sulfur as the active material or a sulfur-containing active material.

In certain variations, such active materials may be intermingled with an optional electrically conductive material and at least one polymeric binder material to structurally fortify the lithium-based active material along with an optional electrically conductive particle distributed therein. For example, the active materials and optional conductive materials may be slurry cast with such binders, like polyvinylidene difluoride (PVDF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum or any other appropriate electrically conductive material known to those of skill in the art.

The negative electrode 22 includes an electroactive material as a lithium host material capable of functioning as a negative terminal of a lithium-ion battery. In various aspects, the electroactive material comprises lithium and may be lithium metal. The negative electrode 22 may thus include the electroactive lithium host material, such as lithium. In other aspects, the electroactive material comprises silicon or silicon-containing alloys. The electroactive material may thus comprise lithium or silicon and may be selected from the group consisting of: lithium metal, silicon metal, silicon-containing alloys, and combinations thereof. For example, lithium-silicon and silicon containing binary and ternary alloys and/or tin-containing alloys include SiSn, SiSnFe, SiSnAl, SiFeCo, $SnO_2$, and the like. Other silicon active materials include silicon oxides. In certain variations, the negative electrode 22 may optionally include an electrically conductive material, as well as one or more polymeric binder materials to structurally hold the lithium material together. Negative electrodes may comprise greater than or equal to about 50% to less than or equal to about 100% of an electroactive material (e.g., lithium particles or a lithium foil), optionally less than or equal to about 30% of an electrically conductive material, and a balance binder.

For example, in one embodiment, the negative electrode 22 may include an active material including lithium metal particles intermingled with a binder material selected from the group consisting of: polyvinylidene difluoride (PVDF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate, and combinations thereof, by way of non-limiting example. In certain variations, the negative electrode 22 may be in the form of lithium metal, such as a metal film comprising lithium (e.g., lithium foil). Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

In certain variations, an electrode may be in the form of lithium metal, such as a lithium foil or film. In other variations, an electrode may be made by mixing the electrode active material, such as lithium particles, into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate, it may be necessary to extract or remove the remaining plasticizer prior to incorporation into the battery cell.

In certain variations, pre-fabricated electrodes formed of electroactive material via the active material slurry casting described above can be directly coated via a deposition formation process to form a conformal composite surface coating, as described further below. Thus, one or more exposed regions of the pre-fabricated negative electrodes comprising the electroactive material can be protectively coated, which can serve to minimize or prevent reaction of the electrode materials with components within the electrochemical cell to minimize or prevent lithium metal dendrite formation on the surfaces of negative electrode materials when incorporated into the electrochemical cell. In other variations, a plurality of particles comprising an electroactive material, like lithium metal, can be coated with a composite surface coating. Then, the coated electroactive particles can be used in the active material slurry to form the negative electrode, as described above.

The negative electrode current collector 32 may be formed from copper or any other appropriate electrically conductive material known to those of skill in the art.

Each of the separator 26, the negative electrode 22, and the positive electrode 24 may include an electrolyte system 30, capable of conducting lithium ions between the negative electrode 22 and the positive electrode 24. The electrolyte system 30 may be a non-aqueous liquid electrolyte solution including a lithium salt and an organic solvent or a mixture of organic solvents.

A battery may thus be assembled in a laminated cell structure, comprising an anode layer, a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab. A protective bagging material covers the cell and prevents infiltration of air and moisture. Into this bag, an electrolyte is injected into the separator (and may also be imbibed into the positive and/or negative electrodes) suitable for lithium ion transport. In certain aspects, the laminated battery is further hermetically sealed prior to use.

In various aspects, the present disclosure provides a negative lithium-containing electrode for a rechargeable electrochemical cell that cycles lithium ions, which may be a battery, supercapacitor, and the like. The electrochemical cell includes a negative electrode material comprising an electroactive material. The electroactive material may comprise lithium or silicon and may be selected from the group consisting of: lithium metal, silicon metal, silicon-containing alloys, and combinations thereof. In alternative aspects, the electroactive material may be other known electroactive materials, including those that suffer from volumetric expansion during lithium cycling in the electrochemical cell.

The electroactive material has one or more exposed surface regions collectively defining an exposed surface area, for example, surface regions that are on a side that faces and is adjacent to the separator and is in contact with electrolyte. The exposed surface area/regions are treated in accordance with certain aspects of the present disclosure to have a composite surface coating or layer disposed thereon. The composite surface layer thus includes organic material matrix and a plurality of particles (e.g., nanocrystals) that are distributed within the matrix. The particles may comprise lithium fluoride (LiF).

In certain aspects, the present disclosure provides a method of making a negative electrode for an electrochemical cell via a deposition process. The method may include applying a fluoropolymer via a deposition process to one or more surface regions of an electroactive material selected from the group consisting of: lithium metal, silicon metal, silicon-containing alloys, and combinations thereof. The fluoropolymer reacts with the electroactive material (e.g., comprising lithium or silicon) to form a composite surface layer on the one or more surface regions that comprises an organic matrix material having lithium fluoride particles distributed therein.

Figure 2:
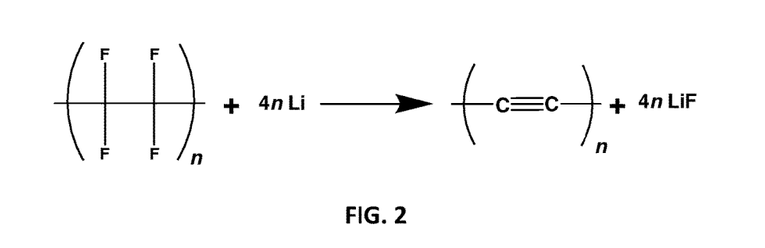
FIG. 2 shows a reaction that occurs between a fluoropolymer and a lithium in accordance with certain aspects of the present disclosure.

FIG. 2 shows a general reaction scheme of when a reaction occurs between a fluoropolymer, namely polytetrafluoroethylene (PTFE), with lithium (e.g., an electroactive material comprising lithium). Lithium (Li) automatically reacts with PTFE to form LiF and C materials as a protective coating. Thus, an initial reaction involves defluorination of the fluoropolymer, so that each fluorine group on the PTFE reacts with a lithium molecule. In this manner, two products are formed in the stoichiometry shown, namely lithium fluoride and an organic material comprising an alkyne group.

Figure 3:
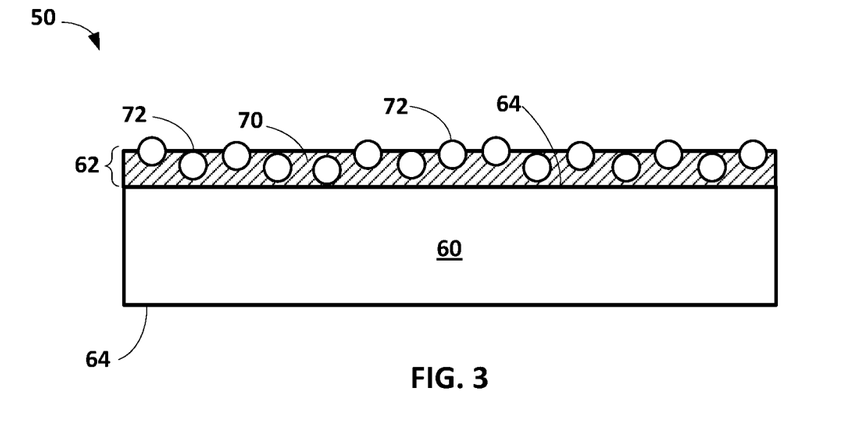
FIG. 3 shows a schematic of a negative electrode having a composite surface layer on an electroactive material prepared in accordance with certain aspects of the present disclosure.

FIG. 3 shows a cross-sectional view of a negative electrode 50 for an electrochemical cell (prior to incorporation into the electrochemical cell) formed by such a reaction. The negative electrode 50 includes an electroactive material 60, such as those described above that may be selected from the group consisting of: lithium metal, silicon metal, silicon-containing alloys, and combinations thereof. A composite surface layer 62 is formed on regions of an exposed surface 64 of the electroactive material 60. In certain variations, greater than or equal to about 90% of an exposed surface area of the exposed surface 64 of the electroactive material 60 is covered with the composite surface layer 62. In certain variations, optionally greater than or equal to about 95% of the exposed surface of the exposed surface 64 of the electroactive material 60 is covered with the composite surface layer 62, optionally greater than or equal to about 97%, optionally greater than or equal to about 98%, optionally greater than or equal to about 99%, and in certain variations, optionally greater than or equal to about 99.5% of the exposed surface area of the electroactive material (e.g., comprising lithium) is covered after the deposition process. In certain aspects, the composite surface coating/layer covers all of the surface regions such that when the negative electroactive material 60 is incorporated into an electrochemical cell and contacts electrolyte, it is protected by the composite surface layer and helps to minimize or suppress formation of harmful lithium dendrites during discharging and charging.

In certain aspects, the processes of the present disclosure can involve ex situ formation and comprehensive surface coverage of a protective layer prior to placement in an electrochemical cell and prior to any exposure to electrolyte. This is in contrast to formation of coatings in situ by reaction of additives present in an electrolyte with the electrode material, for example. Further, reliance on electrolyte additives to form in situ coatings may fail to form consistent and comprehensive surface coatings and further such techniques rely on continuous replenishment by the additive. Thus, when the additive in the electrolyte is depleted, the coating is no longer maintained and the cell can then fail, which often happens after one hundred to two hundred cycles. As noted above, in certain variations, where the electroactive material in the negative electrode does not itself comprise lithium, a defluorination reaction of the fluoropolymer may occur in situ during the first few cycles, where the opposite electrode comprises lithium ions. However, the fluoropolymer has been coated evenly on the surface of the electroactive material and therefore forms a comprehensive surface layer over the exposed surface areas without requiring replenishment by an additive.

As noted above, the composite surface layer 62 includes an organic matrix material 70 having lithium fluoride particles 72 distributed therein. The lithium fluoride particles 72 may be nanoparticles. A nanoparticle may have at least one spatial dimension that is less than about 1 μm (i.e., 1,000 nm), optionally less than about 0.5 μm (i.e., 500 nm), optionally less than about 0.4 μm (i.e., 400 nm), optionally less than about 0.3 μm (i.e., 300 nm), optionally less than about 0.2 μm (i.e., 200 nm), and in certain variations, optionally less than about 0.1 μm (i.e., 100 nm). In certain variations, a nanoparticle may have at least one spatial dimension of about 1 nm to about 500 nm. In certain variations, the lithium fluoride particles 72 are crystalline and may be considered to be nanocrystals.

Figure 4:
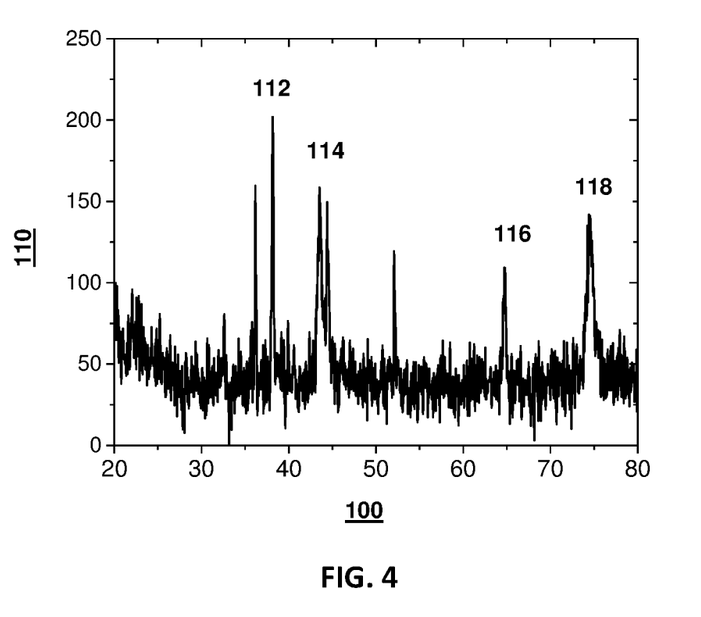
FIG. 4 shows a structural characterization (XRD) of a composite surface layer formed from a deposited PTFE polymer in accordance with certain aspects of the present disclosure.

The composite material of the composite surface layer 62 thus forms during the defluorination reaction of the fluoropolymer described in the context of FIG. 2, where after the reaction with the electroactive material, lithium fluoride particles 72 separate from and are distributed within the substantially defluorinated organic matrix material 70 that comprises a carbon-based composition, which may comprise alkyne groups. For example, as shown in FIG. 4, structural characterization (XRD) of a composite surface layer formed from a PTFE polymer deposited onto a lithium metal having nano-sized LiF crystal structures distributed within the coating/surface layer. The x-axis 100 shows 2θ and the y-axis 110 shows intensity (a.u.). The peak designated 112 shows LiF with a 111 crystal structure, the peak designated 114 shows LiF with a 200 crystal structure, peak designated 116 shows LiF with a 220 crystal structure, and lastly, peak designated 118 shows LiF with a 311 crystal structure.

Figure 5:
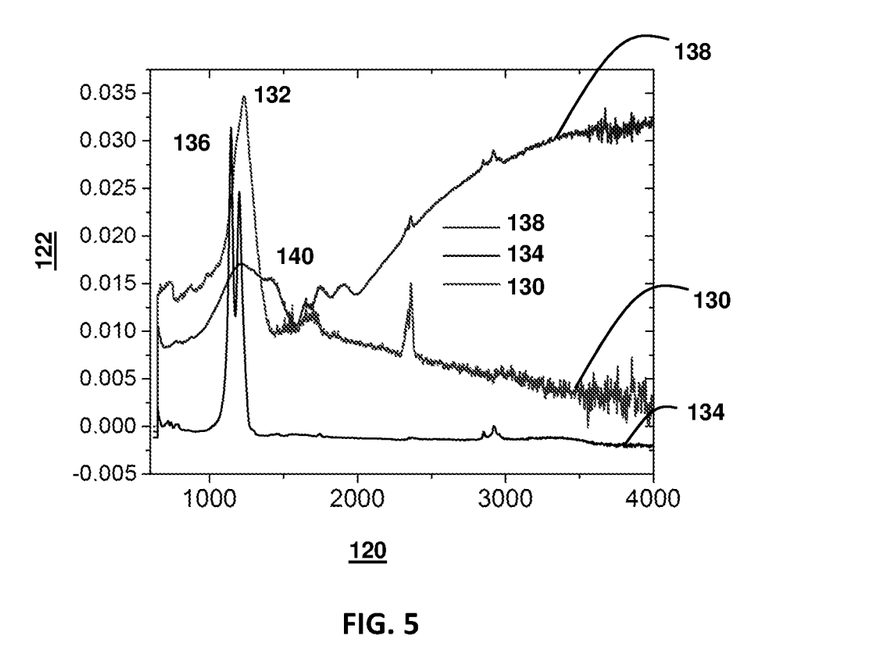
FIG. 5 shows FTIR spectra characterizing an organic carbon matrix material is a composite surface layer formed in accordance with certain aspects of the present disclosure.

FIG. 5 shows FTIR spectra of amorphous carbon formed as a matrix material after the reaction. In FIG. 5, the x-axis 120 shows wavenumber/cm$^{-1}$ and y-axis 122 shows absorption. The trace designated 130 shows PTFE deposited on stainless steel having a peak 132 showing a CC group, a second trace designated 134 shows PTFE having a second peak 136 of a CF$_2$ group, while a third trace 138 shows PTFE deposited on lithium, where a third peak designated 140 corresponds to amorphous carbon.

The composite surface layer 62 is a conformal coating deposited on the exposed surface 64 of the electroactive material 60 of the negative electrode 50 via deposition methods, as will be described further below. The composite surface layer may have a thickness of greater than or equal to about 5 nm to less than or equal to about 50 μm and optionally in certain variations greater than or equal to about 10 nm to less than or equal to about 20 nm. When the electrode 50 (having the composite surface layer 62 on the electroactive material 60) is incorporated into an electrochemical cell, the composite surface layer 62 can serve as the solid electrolyte interface (SEI), which conducts lithium ions there through. A single layer of deposited fluoropolymer, like PTFE, can thus convert into a desirable SEI layer for protecting a lithium-containing electrode. The composite surface layer 62 has strong interfacial bonding with the electroactive material 60 that avoids delamination, but also exhibits elasticity that can help to stabilize the electroactive material 60 during volumetric expansion and contraction or in the case of a lithium metal electrode, can help to stabilize the electrode during lithium plating and stripping and suppress or minimize lithium dendrite formation. Given that the growth of lithium dendrites is a self-amplified process, the coverage of metallic lithium electroactive material 60 by the composite surface layer 62 with strong interfacial bonding to the underlying electroactive material 60 helps suppress the formation of dendritic structures. The surface coating is thus used to help reduce the problem of structural stress and strain and lithium dendrite formation in an anode material during discharge and recharge cycling, by incorporating a flexible material (e.g., the organic matrix material) combined with a strong interfacial bond to the underlying electroactive material. Further, the lithium fluoride (LiF) forms a stable and uniform SEI layer that suppresses or minimizes dendrite growth. As such, the composite surface layer 62 improves the cycling life and diminishes loss of charge capacity of rechargeable batteries and other electrochemical devices that cycle lithium ions. In this manner, next-generation high-energy rechargeable lithium metal batteries are contemplated.

While a variety of fluoropolymers may be suitable, in certain variations, the fluoropolymer may be selected from the group consisting of: polytetrafluoroethylene (PTFE), polyvinyl fluoride (PVF), polyvinylidene fluoride (PVDF), polychlorotrifluoroethylene (PCTFE), perflouoralkoxy alkane (PFA), fluorinated ethylene propylene (FEP), ethylene tetrafluoroethylene (ETFE), ethylene chlorotrifluoroethylene (ECTFE), perfluoroelastomer (FFPM), and combinations thereof. It should be noted that the defluorination reaction may differ from that shown in FIG. 2, but in the presence of lithium the defluorination proceeds so that lithium fluoride particles are created in an organic material matrix comprising a carbon material, such as amorphous carbon. Groups other than alkyne groups may be formed or present in the organic matrix material.

In certain variations, as discussed above, the electroactive material is lithium metal, which may predominantly comprise lithium with only minor impurities (e.g., greater than 99% by mass lithium). The fluoropolymer will react with lithium immediately once the fluoropolymer is deposited onto the lithium metal. In case of electroactive materials that do not contain sufficient levels of lithium, such as silicon or alloys of silicon, defluorination will occur in the first few cycles in the battery cell, where lithium ions migrate from positive electrode to the fluoropolymer coating on silicon. Thus, the reaction can occur in situ in the electrochemical cell so as to form the composite surface coating.

It should be noted that where the electroactive material does not comprise sufficient levels of lithium, for example, where the electroactive material comprises silicon metal or a silicon-containing alloy, the electroactive material may be pre-lithiated to infuse or coat the surface of the electroactive material with lithium in amounts sufficient to react with the fluoropolymer in a desired defluorination reaction to form the lithium fluoride particles in a composite layer. Therefore, in certain variations, the electroactive material is silicon metal or a silicon-containing alloy and the method further comprises pre-lithiating the electroactive material prior to applying a fluoropolymer via a deposition process.

In certain variations, the electroactive material is provided as a foil or a film of the electroactive material, so the applying of the fluoropolymer via a deposition process is to one or more surface regions of the foil or metal. In other variations, the electroactive material is contained in a pre-fabricated electrode layer and the composite surface layer is formed on at least one surface of the pre-fabricated electrode layer. In yet other variations, the electroactive material is in the form of a plurality of particles, so that the composite surface layer is applied to the plurality of particles that subsequently form the negative electrode in the processes described previously above.

In certain aspects, a temperature in a reaction chamber during the deposition process is less than or equal to about 180° C. Pressure in the reaction chamber where the deposition process occurs maybe from ambient down to high vacuum ($10^{-6}$ torr). In various aspects, an atmosphere within the reaction chamber is inert, for example, an argon atmosphere.

The deposition process may be selected from the group consisting of: physical vapor deposition (PVD), chemical vapor deposition (CVD), and wet chemistry polymerization. By way of non-limiting example, physical vapor deposition (PVD) processes may include thermal evaporation, sputtering, and the like. By way of non-limiting example, the chemical vapor deposition (CVD) may include low pressure chemical vapor deposition (LPCVD), thermal CVD, and the like. The wet-chemistry may include monomer to polymerization processes. After depositing the composite surface layer, it may be subjected to a secondary heat treatment, for example, exposed to 120° C. for about 30 minutes in inert atmosphere.

In certain other aspects, the method further comprises forming an electrochemical cell that cycles lithium ions. Such a method may include assembling the negative electrode (prepared in accordance with any of the variations described above) with a positive electrode, a separator, and an electrolyte to form the electrochemical cell. In certain variations, the electrochemical cell is capable of maintaining charge capacity within 25% of an initial charge capacity for greater than or equal to about 500 hours of operation. As such, the negative electrodes prepared in accordance with certain aspects of the present disclosure can provide lithium-ion batteries having improved cycle stability and increased energy density.

Various embodiments of the inventive technology can be further understood by the specific examples contained herein. Specific examples are provided for illustrative purposes of how to make and use the compositions, devices, and methods according to the present teachings and, unless explicitly stated otherwise, are not intended to be a representation that given embodiments of this technology have, or have not, been made or tested.

Example 1

A radio frequency magnetron sputtering system is used to deposit polytetrafluoroethylene (PTFE) coating at room temperature (about 21° C.). A 3 inch diameter PTFE disk is used as a sputtering target. When the target is bombarded with Ar ions, the sputtered PTFE is then deposited on a lithium metal disk/substrate. The RF power is 170 W, with 2 sccm Ar flow. The coating thickness is around 1 micron.

Example 2

An electrochemical test is conducted as follows. A symmetric cell with PTFE coated Li disk (13 mm in diameter) as a negative electrode is assembled in Ar filled glovebox. The electrolyte in the cell includes 1M $LiPF_6$ in EC:DEC. The cell is cycled with current density of 1 mA/cm² and a capacity of 4 mAh/cm². The cut-off voltage is ±0.5 voltage. The control cell is uncoated Li disks with the same size.

Figure 6:
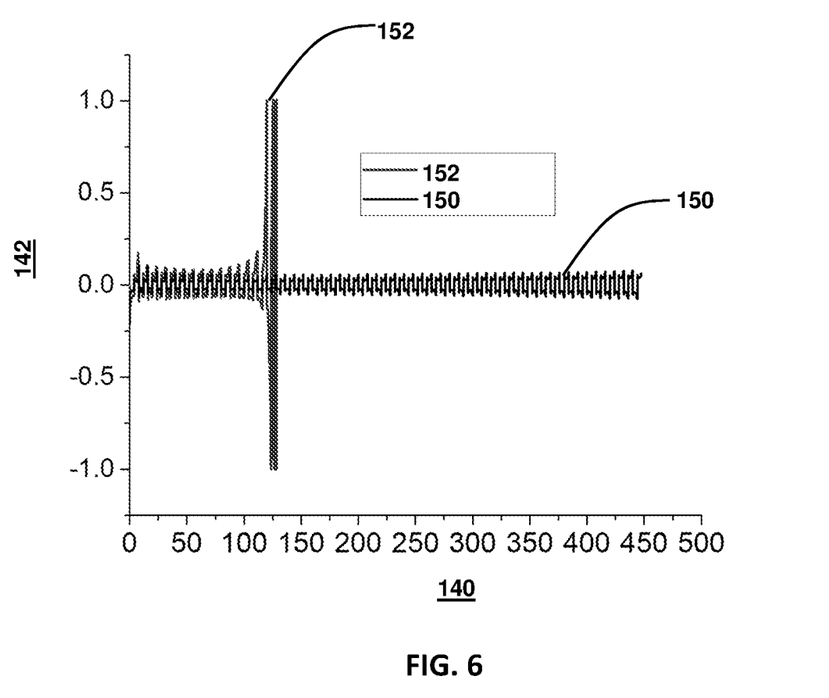
FIG. 6 shows comparative cycle performance for symmetric cells including an uncoated lithium metal control electrode and a PTFE coated lithium metal electrode prepared in accordance with certain aspects of the present disclosure.

FIG. 6 shows cycle performance in a plot of voltage (V) on an y-axis 142 over time (hours) on an x-axis 140 for a symmetric cell with the PTFE coated Li disk 150 prepared in accordance with certain aspects of the present disclosure and the control 152 incorporating an uncoated Li disk. As can be seen, the control cell 152 fails around 125 hours, while the PTFE coated Li disk 150 continues successfully cycling past 450 hours. Thus, the presence of the composite surface layer on the lithium disk improves the cycle stability when it serves as a lithium metal electrode in a symmetric electrochemical cell.

Example 3

A half cell with PTFE coated Si thin film (100 nm thick and 12 mm in diameter) on a Cu substrate is assembled in Ar filled glovebox, with a 15 mm Li disk as the counter electrode. In this example, the silicon is not prelithiated, as it is incorporated into a half cell where the counter Li electrode provides sufficient Li to the system. The electrolyte in the cell includes 1M $LiPF_6$ in EC:DEC. The cell is cycled with current density of 10 micron A/cm² and the cut-off voltage is 1V and 0.05V. The control cell is uncoated Si film electrode with the same size.

Figure 7:
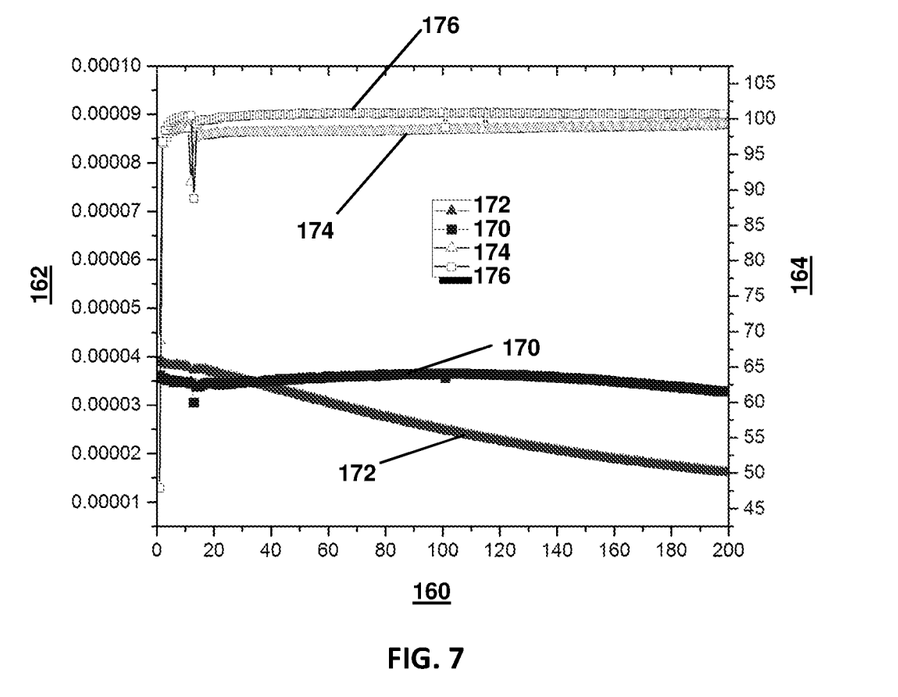
FIG. 7 shows comparative cycle performance for symmetric cells including an uncoated silicon coated copper control electrode and a PTFE deposited on a silicon-coated copper electrode prepared in accordance with certain aspects of the present disclosure.

FIG. 7 shows comparative cycle performance in both a plot of charge capacity (Ah) on an y-axis 162 versus an x-axis 160 of cycle index for a symmetric cell with the PTFE coated silicon thin film 170 prepared in accordance with certain aspects of the present disclosure and a control 172 incorporating an uncoated silicon film copper disk. FIG. 7 also shows Coulombic Efficiency (CE) on the opposite y-axis 164 versus cycle index x-axis 160. The CE for the symmetric cell with the PTFE coated silicon thin film 174 prepared in accordance with certain aspects of the present disclosure is compared to the CE for the control 176. The first low cycle efficiency (CE) from PTFE coated silicon thin film 174 indicates the coating consumed lithium due to the defluorination process. However, the PTFE coated silicon thin film shows much higher charge capacity than the control 172 over 200 cycles. Thus, the PTFE coating suppresses mechanical degradation in the Si-based electrode.

Example 4

A radio frequency magnetron sputtering system is used to deposit polyvinylidene fluoride (PVDF) coating at 20° C. temperature. A 3 inch diameter PVDF disk is used as a target. The RF power is 170 W, with 2 sccm Ar flow. The coating thickness is around 0.5 micron. PVDF deposited on lithium also shows defluorination and forms lithium fluoride crystals distributed through a polymeric carbon matrix, confirmed by XRD and FTIR.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a negative electrode for an electrochemical cell that cycles lithium ions, the method comprising:

applying a fluoropolymer via a deposition process to one or more surface regions of an electroactive material selected from the group consisting of: lithium metal, silicon metal, silicon-containing alloys, and combinations thereof, wherein the electroactive material is contained in a pre-fabricated electrode layer and the fluoropolymer reacts with lithium to form a composite surface layer on the one or more surface regions that comprises an organic matrix material having lithium fluoride particles distributed therein and has a thickness greater than or equal to about 5 nm to less than or equal to about 20 nm, and the composite surface layer is formed on at least one surface of the pre-fabricated electrode layer.

2. The method of claim 1, wherein the fluoropolymer is selected from the group consisting of: polyvinyl fluoride (PVF), polyvinylidene fluoride (PVDF), polytetrafluoroethylene (PTFE), polychlorotrifluoroethylene (PCTFE), perfluoroalkoxy alkane (PFA) fluorinated ethylene propylene (FEP), ethylene tetrafluoroethylene (ETFE), ethylene chlorotrifluoroethylene (ECTFE), perfluoroelastomer (FFPM), and combinations thereof.

3. The method of claim 1, wherein a temperature in a reaction chamber during the deposition process is less than or equal to about 180° C.

4. The method of claim 1, wherein the deposition process is selected from the group consisting of: physical vapor deposition (PVD), chemical vapor deposition (CVD), and wet chemistry polymerization.

5. The method of claim 1, wherein the electroactive material is lithium metal.

6. The method of claim 1, wherein the electroactive material is provided as a foil or a film of the electroactive material.

7. The method of claim 1, wherein the electroactive material is silicon metal or a silicon-containing alloy and the method further comprises pre-lithiating the electroactive material prior to the applying.

8. The method of claim 1, wherein the method further comprises forming an electrochemical cell that cycles lithium ions, the method comprising:
assembling the negative electrode of claim 1 with a positive electrode, a separator, and an electrolyte to form the electrochemical cell, wherein the electrochemical cell is capable of maintaining charge capacity within 25% of an initial charge capacity for greater than or equal to about 500 hours of operation.

9. The method of claim 1, wherein the fluoropolymer is selected from the group consisting of: polyvinyl fluoride (PVF), polychlorotrifluoroethylene (PCTFE), perfluoroalkoxy alkane (PFA) fluorinated ethylene propylene (FEP), ethylene tetrafluoroethylene (ETFE), ethylene chlorotrifluoroethylene (ECTFE), perfluoroelastomer (FFPM), and combinations thereof.

10. The method of claim 1, wherein the composite surface layer has a thickness greater than or equal to about 10 nm to less than or equal than about 20 nm.

11. A negative electrode for an electrochemical cell that cycles lithium ions, prior to incorporation into the electrochemical cell, the negative electrode comprises:
an electroactive material selected from the group consisting of: lithium metal, silicon metal, silicon-containing alloys, and combinations thereof, wherein the electroactive material is contained in a pre-fabricated electrode layer; and
a composite surface layer formed on greater than or equal to about 90% of an exposed surface area of the electroactive material, wherein the composite surface layer comprises an organic matrix material having lithium fluoride particles distributed therein and has a thickness greater than or equal to about 5 nm to less than or equal to about 20 nm, and wherein the composite surface layer is formed on at least one surface of the pre-fabricated electrode layer.

12. The negative electrode of claim 11, wherein the composite surface layer is formed on greater than or equal to about 98% of the exposed surface area of the electroactive material.

13. The negative electrode of claim 11, wherein the organic matrix material comprises an alkyne group and the lithium fluoride particles are nanocrystals.

14. The negative electrode of claim 11, wherein the electroactive material is lithium metal provided as a foil or a film.

15. The negative electrode of claim 11, wherein the composite surface layer has a thickness greater than or equal to about 10 nm to less than or equal to about 20 nm.

16. An electrochemical cell that cycles lithium ions comprising:
a negative electrode comprising an electroactive material selected from the group consisting of: lithium metal, silicon metal, silicon-containing alloys, and combinations thereof, wherein the electroactive material is contained in a pre-fabricated electrode layer and having a composite surface layer formed on greater than or equal to about 90% of an exposed surface area of the electroactive material, wherein the composite surface layer comprises an organic matrix material having lithium fluoride particles distributed therein and has a thickness greater than or equal to about 5 nm to less than or equal to about 20 nm, and wherein the composite surface layer is formed on at least one surface of the pre-fabricated electrode layer;
a positive electrode;
a separator; and
an electrolyte.

17. The electrochemical cell of claim 16, wherein the electrochemical cell is capable of maintaining charge capacity within 25% of an initial charge capacity for greater than or equal to about 500 hours of operation.

18. The electrochemical cell of claim 16, wherein the composite surface layer has a thickness greater than or equal to about 10 nm to less than or equal to about 20 nm.

* * * * *